United States Patent
Schweitz et al.

(10) Patent No.: US 6,594,822 B1
(45) Date of Patent: Jul. 15, 2003

(54) METHOD AND APPARATUS FOR CREATING A SOFTWARE PATCH BY COMPARING OBJECT FILES

(75) Inventors: Eric A. Schweitz, Cary, NC (US); David J. Werlinger, Durham, NC (US); Peter H. Mills, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 399 days.

(21) Appl. No.: 09/590,431

(22) Filed: Jun. 8, 2000

Related U.S. Application Data

(63) Continuation-in-part of application No. 09/252,738, filed on Feb. 19, 1999, now abandoned.

(51) Int. Cl.$^7$ .................................................. G06F 9/45
(52) U.S. Cl. ..................... 717/140; 717/168; 707/103
(58) Field of Search .......................... 707/103 R, 203, 707/511, 515; 717/168, 140

(56) References Cited

U.S. PATENT DOCUMENTS

| | | | | |
|---|---|---|---|---|
| 5,481,713 A | * | 1/1996 | Wetmore et al. | 717/170 |
| 5,619,698 A | * | 4/1997 | Lillich et al. | 717/168 |
| 5,675,802 A | * | 10/1997 | Allen et al. | 707/203 |
| 5,832,520 A | * | 11/1998 | Miller | 707/203 |
| 6,052,531 A | * | 4/2000 | Waldin et al. | 707/10 |
| 6,071,317 A | * | 6/2000 | Nagel | 717/128 |
| 6,135,651 A | * | 10/2000 | Leinfelder et al. | 717/168 |
| 6,161,218 A | * | 12/2000 | Taylor | 717/168 |
| 6,167,567 A | * | 12/2000 | Chiles et al. | 717/11 |
| 6,282,709 B1 | * | 8/2001 | Reha et al. | 717/11 |
| 6,289,509 B1 | * | 9/2001 | Kryloff | 717/11 |

OTHER PUBLICATIONS

Luski, Janusz, "Identification of Program Modifications and its Applications in Software Maintenance", IEEE, 1992, pp. 282–290.*

* cited by examiner

*Primary Examiner*—Greta Robinson
*Assistant Examiner*—Sathyanarayan Pannala
(74) *Attorney, Agent, or Firm*—Wintrow & Terranova, PLLC

(57) ABSTRACT

Method and apparatus for creating a software patch by comparing object files. Method and apparatus are provided that create a software patch using object files of two software sources. The invention creates software patches for software programs written any high-level language so long as the programs compile to a standard object file format, and required information can be recovered. Functions of a compiled version of an existing software program are compared with an updated version that is compiled in a separate object file to discover a minimal set of changes, or "deltas" (for the patching process). The process for creating a patch includes decomposing the object file into cantles, examining fix-up information, creating reduced program dependency graphs, and comparing the graphs to determine the changes and create the patch. Because the software has already been compiled into object files, the invention is source-code independent and can be applied to code written in C/C++, Pascal or even to other specific proprietary languages.

12 Claims, 8 Drawing Sheets

METHOD AND APPARATUS FOR CREATING A SOFTWARE PATCH BY COMPARING OBJECT FILES

CROSS-REFERENCE TO RELATED APPLICATION

This application is a continuation-in-part of and claims priority from U.S. patent application Ser. No. 09/252,738, filed Feb. 19, 1999, abandoned, which is assigned to the assignee of the present application and which is incorporated herein by reference.

BACKGROUND

1. Field of the Invention

This invention relates to a process of patching by comparing object files. In particular, this invention relates to a method and apparatus for creating a software patch using the object files of two software sources to create individual reduced program dependency graphs and comparing these reduced program dependency graphs to determine a minimal set of changes for the patching process.

2. Description of the Problem Solved

"Software patch" is a term which refers to a software file, generally a binary file, that comprises data or instructions to upgrade an old version of a software program to a new version of that same software program. The existing process of producing patches for computer programs such as C/C++ traditionally is very tightly coupled to a particular process and the particular behavior of a specific toolset, i.e., compiler, linker and assembler. There is little cohesiveness amongst toolsets available for development. For example, they may not support the same syntax for C or assembly, may not generate object files in the same format, and may not provide the same functionality. Lack of uniformity of standards causes problems in portability of applications among toolsets. Also, software developers will typically develop software patches specific to code written in C/C++ languages rather than developing the patches to be language independent. While technology exists that is used to create patches for a variety of manufacturers, it is future limited, difficult to maintain and requires parallel strategies and processes to support patching code written in other languages even for the same product or the same logical in-field update.

In general, a patch-writer, the person who develops a patch, typically is creates a patch by comparing the code of an old software program with the code of an updated version of the program and determining the upgraded changes. The resulting software patch, therefore, essentially comprises only the changes contained in the new software program that are not found in the old software program. Typically, a patch-writer will create the software patch at his desktop computer or workstation. The patch is then physically taken to a computer system, installed on a disc or storage medium having the old software program to be upgraded, and is installed or downloaded onto the computer. Alternatively, a patch may be electronically delivered to a computer system through a communications network, e.g., the Internet.

A patch, when applied to a computer system, will change the behavior of the computer system from the old version of the software to the upgraded or new version of the software. A patch can be installed, downloaded or delivered to a computer system and thereby upgrade the software without taking the computer system off-line. Patching, therefore, as defined above, is typically used to upgrade existing software of a computer system in the field, where changes must be made without interrupting the operations of the computer system. For example, a computer at a telephone switch is in constant use, i.e., connecting telephone calls, and therefore, cannot be conveniently pulled off-line to have its software upgraded. Thus, the software patch may be utilized to upgrade the computer software without interrupting its operations.

The benefits, therefore, of patching software versus updating a computer system's software in its entirety are several. First, patching produces a small fix for a small software error and thus is a quick way to deliver and administer "quick fixes," particularly in emergency situations. Patching also provides a way to change the software on-the-fly, so that the entire system need not be taken out-of-service and reloaded. Finally, patching can be implemented to provide a mechanism called "activatable patches". The term, activatable patches, as used herein means patches which may be turned on and off while the program is being utilized as deemed appropriate by a patch-writer. This essentially allows the system to have two possible behaviors for a particular functionality, patches that are either in the on or off state. Computer programs are generally written in high level languages, such as FORTRAN, C/C++, Pascal, and BASIC. A computer programmer writes programs in a high level language to direct the computer to execute certain commands. Commands in a high level language are relatively easy to learn and users can run many programs on many different computers using the same high level language commands. Computers, on the other hand, cannot execute commands from a high level language. Typically, the microprocessor understands and executes commands using only a set of commands unique to the computer. The high level language must be compiled, that is, translated, from the high level language to a machine readable language computers can understand.

Compiling a program written in a high level language to machine executable object code is well known in the art. After the entire program is written in the high level language, the user requests that the program be compiled for execution in machine language. A software program known as a compiler reads the commands and data in the high level language and generates an object file having machine readable code corresponding to the commands of the high level language.

Traditionally telecommunications companies had control over the software that was used on computer systems in the field. Telecommunications companies wrote their own proprietary software tools to control the computer systems and developed their own internal compilers to translate software into machine code which can be understood and acted upon by a computer. Such companies, therefore, had total control over the computer system hardware, the software, and the process of developing and upgrading software, including creating patches.

However, with the evolution of new software languages and the rapidly improving technology of compilers producing faster and smaller code, many companies now do not have the luxury of developing and using their own proprietary languages to control computer systems, but have had to yield to market pressure and use languages, such as C/C++, which are today's mainstream programming languages. This has made the job of controlling a computer system's software and creating patches more difficult. Given that C/C++ is the preferred and commonly used software language and that telecommunications companies generally purchase off the shelf compilers for programs written in C/C++, there is no direct way to develop and create a patch for software programs written in C/C++ languages.

The known method of creating patches for software modules written in C/C++ languages is very difficult to maintain and time consuming. For example, to create a patch for programs written in C/C++ languages, a patch-writer must: 1) compile the software into an intermediate language, the assembly language, and 2) perform an analysis on that language. Under this method, the patch-writer would have to take the entire software package and analyze all of the software programs to determine the changes for the patching process. In addition, to create a patch using the assembly language, the patch writer must compare each textual line in the old software program to each corresponding textual line in the upgraded version of the software program. Because of numerous branching sequences which jump to various places in a program, it is difficult to create a patch by making line-by-line comparisons of programs with branching sequences. For example, the assembly language of an old software program may comprise a first function and a second function in numerical order. Although the assembly language of the new upgraded software program might comprise the same first and second functions, they might be in reverse order. The patch writer, therefore, might not be able to readily determine that the functions in the old assembly language and the new assembly language are the same. As the need for software patches has increased, the sophistication of the development of processes to create patches has not kept pace.

What is needed is an efficient and reliable method and apparatus for creating a patch for software by determining a minimal set of changes known as deltas. Optimally, the process will permit source-language target processor and compiler vendor independence. The method and apparatus is needed to create patches from the assembly language of software by comparing the object files, the actual machine language of the software. The foregoing problems are solved by a method apparatus that function to compile an old version of a software program and an upgraded version into separate object files. The object files then are decomposed into nodes or "cantles", and are used to generate separate reduced program dependency graphs (RPDG) for both software programs. The RPDG include a plurality of nodes that are linked together. The two RPDG's are compared to determine the minimal upgraded changes and create a patch therefrom comprising of the changed or added functions.

It is therefore an object of this invention to provide a method and apparatus that creates a patch using object files of programs written in high level languages such as C/C++ instead of creating a patch from a processor and compiler vendor specific intermediate representation such as assembly.

It is another object of this invention to provide a method and apparatus that creates a patch by decomposing object files into nodes or cantles.

It is another object of this invention to provide a method and apparatus that creates a patch by comparing RPDG's.

It is another object of this invention to provide a method and apparatus that creates a patch by comparing functions of an object file of an old software program component to functions of an object file of a new upgraded software program component.

It is another object of this invention to provide a method and apparatus that is source-code independent and can be applied to code written in C/C++, Pascal or even to specific proprietary languages.

It is another object of this invention to efficiently create a patch to update existing software on a computer system without having to pull the computer off-line.

SUMMARY

The present invention solves the above mentioned problems by providing a method and apparatus for creating software patches for software programs written in C/C++, Pascal or specific proprietary languages so long as they compile to a standard object file format. Functions of a compiled version of an existing software program are compared with an updated version that is compiled in separate object files to discover a minimal set of changes, or "deltas" (for the patching process). Object files themselves typically include a single module for a larger program. Because the software has already been compiled into object files, the invention is source-code independent and can be applied to code written in C/C++, Pascal or even to specific proprietary languages. The process for creating a patch from the object file, includes, first, decomposing each object file into cantles, partitioning relocation information (which we call fix-up information or fix-ups), and associating it with the various cantles. Next, the steps of examining each cantle and adding fix-ups for any references to other cantles, constructing a reduced program dependency graph (RPDG) from the cantles (nodes) and their fix-ups (edges) for each object file, and comparing the two RPDG's to determine the differences between their functions are performed. Finally, a listing of differences between the functions of the two RPDG's is developed and a patch comprised of the listed differences between the functions of the two RPDG's is developed.

With the present invention, the old software and new software are compiled into individual object files as commonly known. The object files of the old software code and new software code contain data, constants, and various artifacts of the source code. The term "cantles" as used in this invention refers to the product produced from "cantlization." Each object file undergoes a process called cantlization. The term "cantlization" generally means the process of structuring of the object files into uniformed cantles (sub-parts) so that individual RPDG's can be constructed for the old and new software codes. The cantles are actual functions from the original source (i.e., the code), variables and constants. Other information in the object files, called fix-ups, sometimes known in the art as relocations, are used to determine the dependencies between the various cantles.

A patch created under this invention is composed of mutually dependent functions. A function is actually a segment code in the object files. Since software patches will typically contain functions, in the preferred embodiment, the invention determines which functions are represented by is which cantles. From the fix-up information present in the object file, the invention can determine the dependencies of each function with respect to all other functions, variables, constants, etc., of the larger, whole program.

Individual reduced program dependency graphs are developed for the old and new object files. Each reduced program dependency graph is comprised of nodes. These nodes represent functions, variables, etc. The interconnections of the nodes are determined from fix-up information from the object file. The RPDG's for the new and old software are compared to determine the differences between functions of the old and new software. As the RPDG's are compared, the nodes are marked to determine which functions have changed in the old software code and/or which functions have been added to the new software code. These changes are captured, controlled, and the patch is automatically produced, generally, in a binary file format comprised of the changed functions only. The resulting patch produced in this manner can be sent to a computer in the field to upgrade the old version of a computer's software.

These and other features, and advantages, will be more clearly understood from the accompanying drawings. However it will be appreciated that there may be many other embodiments of the present invention, which are not specifically illustrated.

DETAILED DESCRIPTION

Figure 1:
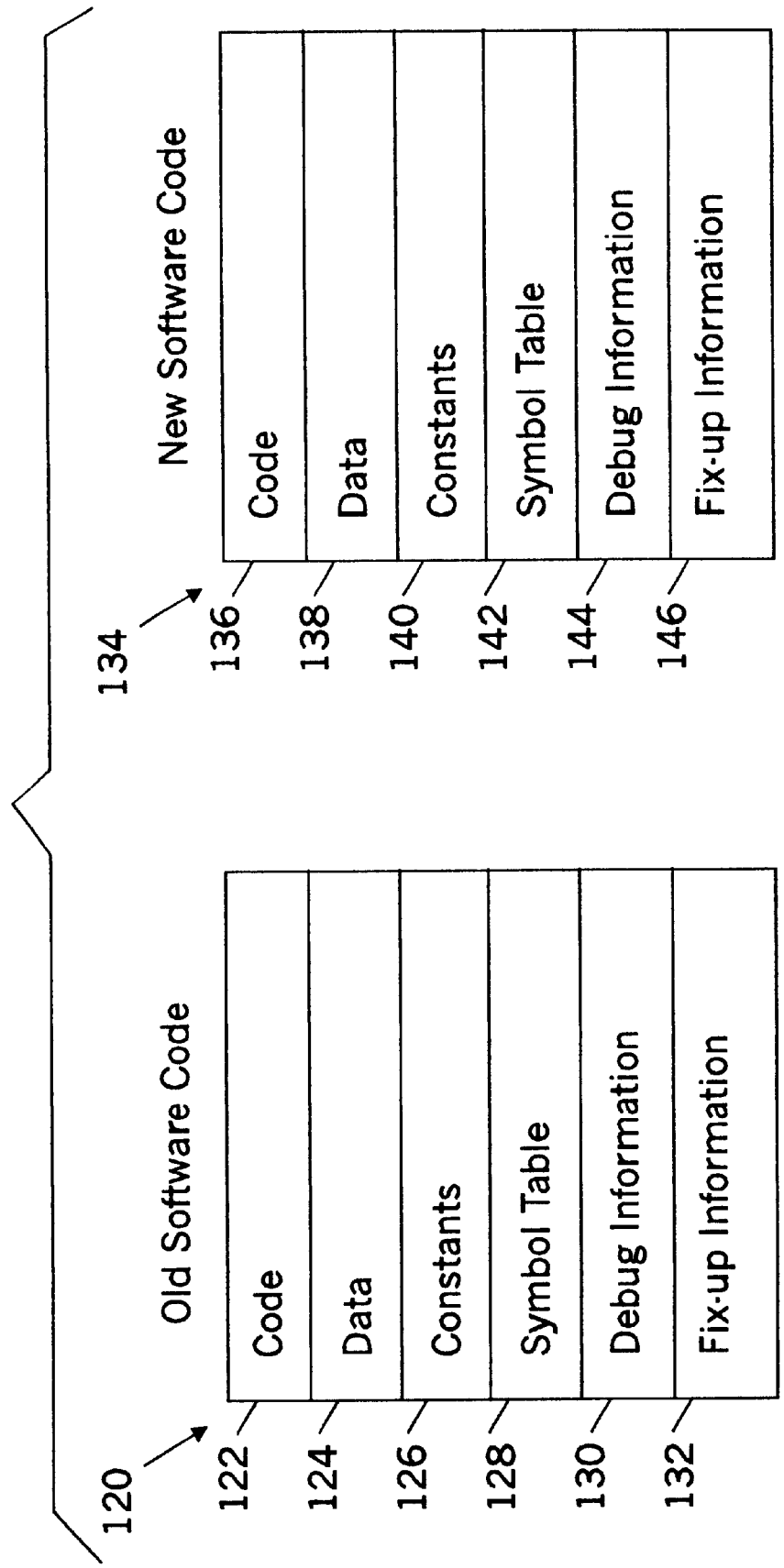
FIG. 1 is a diagram that illustrates object files of an old software code and a new software code that has been individually decomposed into cantles.

The process to create a patch using this invention is applied to upgrade software on mainstream computers that use, for example, MOTOROLA'S Power PC processors, as well as other manufacturer's processors commonly known in the art, e.g., INTEL, AMD, etc. FIG. 1 is a diagram that illustrates the way object files are decomposed into "cantles". The object file of old software code 120, and the object file of new software code 134, are depicted after each has been decomposed into "cantles". This term "cantles", as used in this invention, refers to the product produced from "cantlization." The old software code 120 includes information which can be divided into related groups of information as follows: code 122, data 124, constant 126, symbol table 128, debug information 130, and fix-up information 132. Similarly, the new software code is also divided into sub-parts: code 136, data 138, constants 140, symbol table 142, debug information 144, and fix-up information 146. The term "cantlization" generally means the process of decomposing the object files into typed cantles so that individual RPDG's can be constructed for the old and new software codes.

Figure 2:
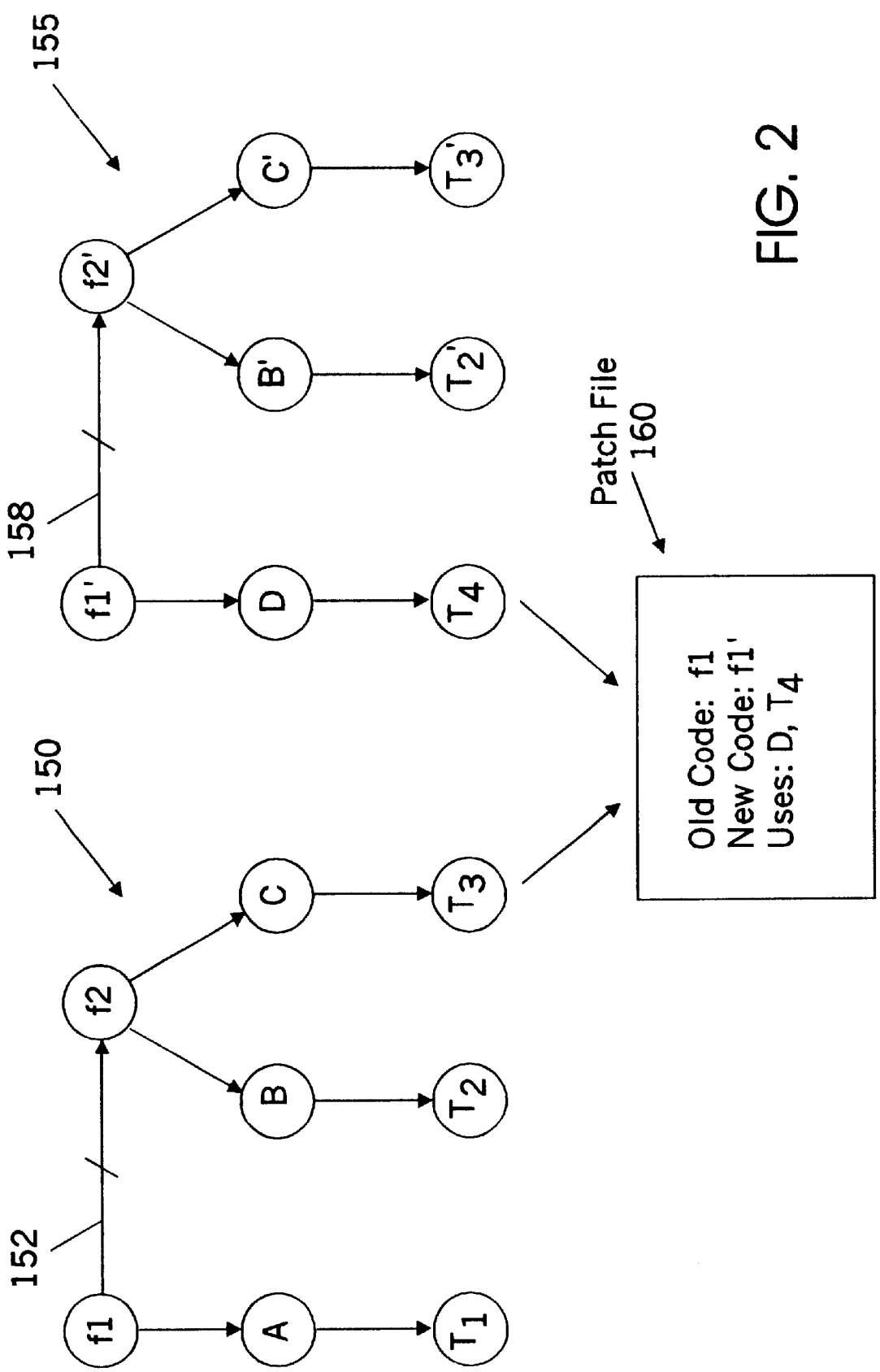
FIG. 2 is a diagram that illustrates reduced program dependency graphs (RPDG's) developed from the cantles in FIG. 1.

FIG. 2 is a diagram that illustrates RPDG's for old software code and new software code that are constructed from cantles. The RPDG for the old software code 150 comprises functions f1 and f2, which are also referred to as nodes. Functions f1 and f2 are linked together, shown by line 152. Function f1 is connected to $T_1$ via A, which are also referred to as nodes. Function f2 is linked to $T_2$ and $T_3$ via B and C, respectively. A, B, C, $T_1$, $T_2$ and $T_3$ are all part of the old software code and generally are variables, constants and the like. The RPDG for the new software code 155 comprises f1' and f2', which are linked together, shown by line 158. Function f1' is linked to $T_4$ via D and is also linked to $T_2'$ and $T_3'$ via B' and C', respectively. Functions f1' and f2' in the RPDG for the new software code 155 will be compared to functions f1 and f2 in the RPDG for the old software code 150 to determine the upgraded changes between the old and new software codes. Once the changes between the new software code and old software code are determined, a patch file 160 is created. The patch file is comprised of changed and added functions and their inter-dependencies. The patch illustrated in FIG. 2 will be comprised of the changes for f1. In the old software code, f1 was linked to A and $T_1$. In the new software code f1' is linked to D and $T_4$. The patch, therefore, will contain only the replacement code for f1, which is shown as f1', which includes D and $T_4$. Function f2 will not be added to the patch since it did not change.

Figure 3A:
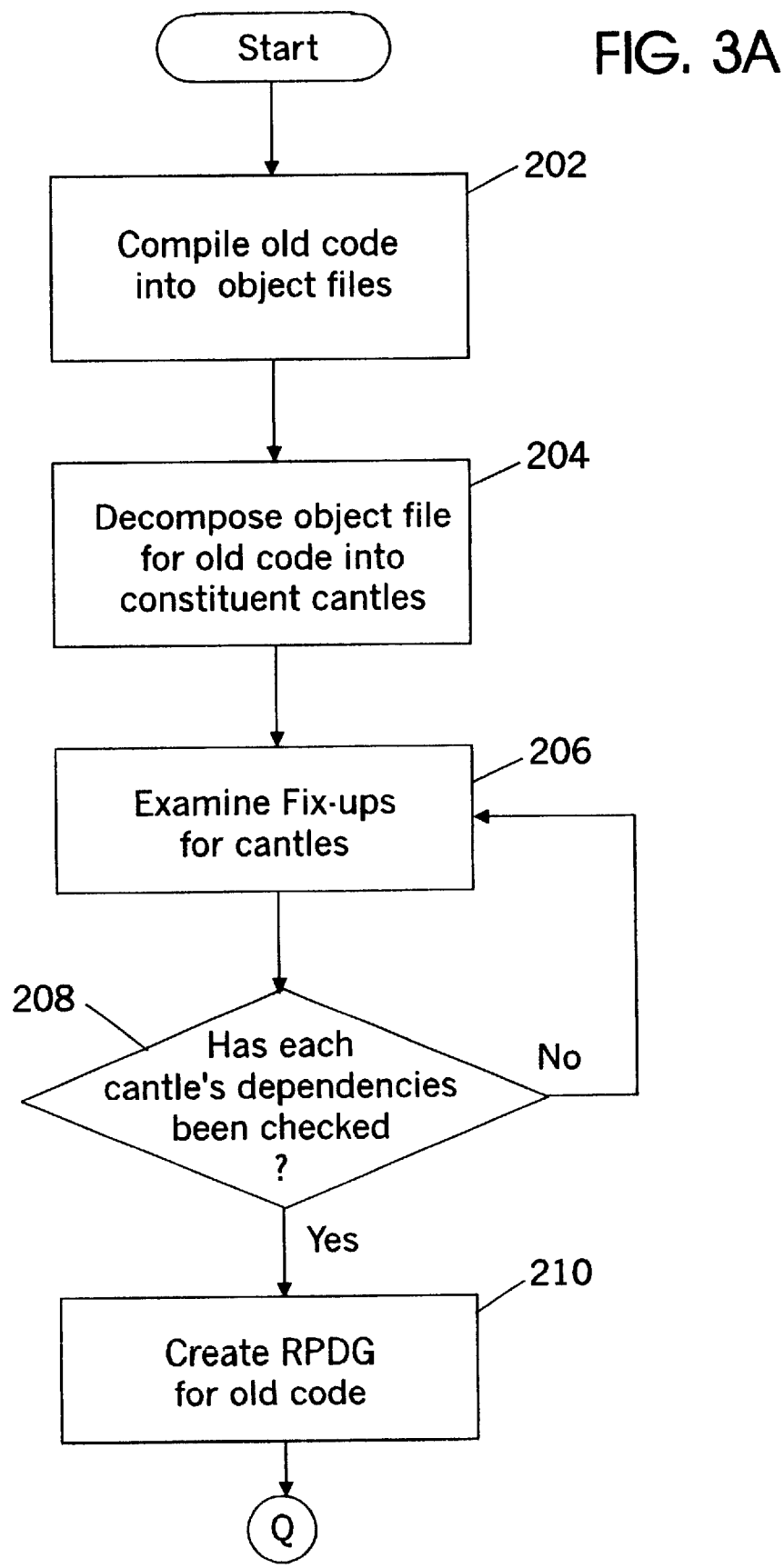
FIGS. 3A–3C are flow charts which describe the steps of creating a patch in accordance with the present invention.
Figure 3B:
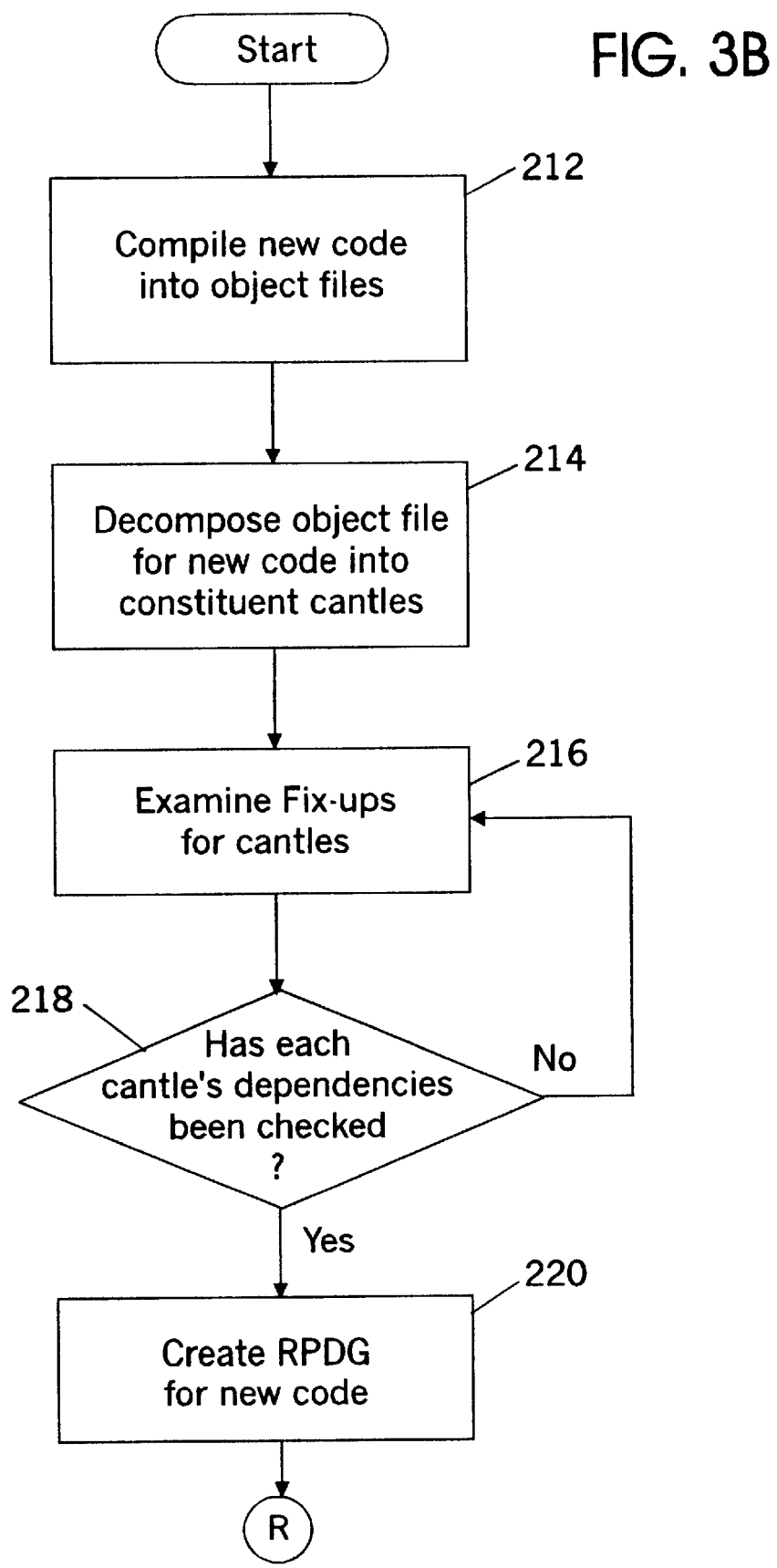
Figure 3C:
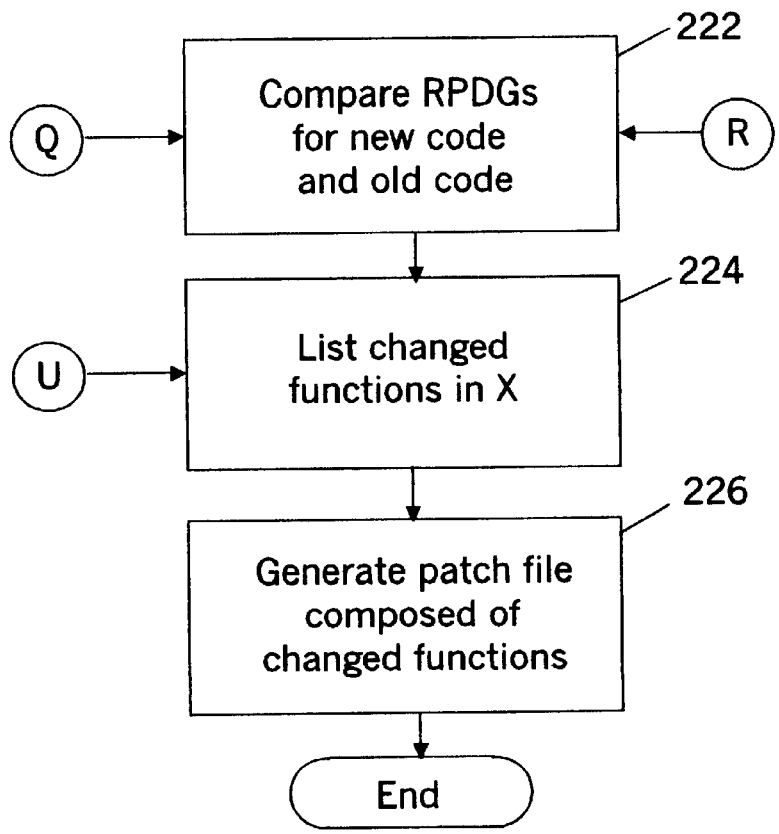

FIGS. 3A–3C are flow charts that illustrate the method of creating a patch in accordance with the present invention. The method may be implemented through programming instructions stored in a processor computer-readable storage medium. A processor computer-readable storage medium containing a set of instructions may be any type of digital storage device such as RAM, ROM, disc, diskette, Magnetic Tape, Flash Memory, or CD-ROM.

Referring now to FIG. 3A, the process of creating a patch begins at step 202 wherein an old software code is compiled into object files. The old software code is compiled into a standard object file format. It is appreciated that this invention will work with any vendor compiler so long as it will compile the old software code into a standard object file format. Examples of standard formats include ELF-Dwarf, IEEE, and COFF. Still referring to FIG. 3A, in step 204, the object file for the old software code is decomposed into constituent cantles as illustrated in FIG. 1. These cantles comprise logical structures from the original source, i.e., the code, variables and constants. Decomposed information of the same type, such as variables, may be grouped into sections. These sections include logical structures for symbol tables, debug, code, ready-only data, read-write data, zero data, data objects, fix-up records, string tables, and possibly other information when it is used to create cantles. For example, the information in a symbol table is used to recover all the logical structures, i.e., cantles, from the object file. The symbol table(s) is parsed and cantles are extracted during patch development. The debug section(s) are also parsed to locate potential cantles and any missing information on the cantles from the symbol table. In the debug section(s), records that reflect information about source files, functions, data-objects and type information may be examined. The invention uses this information to locate functions of static linkage, names of data objects not in the symbol table, and type information about cantles in the object file.

Functions will have an offset, size, and value in the object file. Constants and pre-initialized static variables will have an offset, size, and value. Static variables will have an offset and size value. The invention ignores automatic (stack allocated) data-objects. The offset and size values are used to scan the table of fix-ups and make the proper association between those fix-ups which operate on a particular cantle. All of the fix-ups are maintained in a list associated with a particular cantle. The symbol table provides a mechanism to associate a particular label (symbol) with a particular recovered cantle from the object file. The symbol table, however, is not sufficient to determine all characteristics of a cantle. Information from the fix-ups is utilized to provide "requires-type" information needed to develop the relationship between cantles in the entire program.

Still referring to FIG. 3A, the fix-ups for the cantles are examined in step 206. The fix-ups are part of the object file and contain information of the dependencies of the functions. Essentially, the fix-ups contain information as to how the functions and their requires-type interdependencies in an object file are linked together. Constants need not be symbolic and, therefore, the constant area may have to be "diced" to determine the size of a "new cantle" which resides in the constant section of memory. To dice a memory section, areas that are known to have cantles are marked. The set of all fix-ups to a particular memory section is examined and if they point to a block which is not already marked, a boundary marker is placed at that location. After this operation, the size of a "new cantle" is assumed to be the size of the block between the two boundary markers. For example, if there are two constant tables of ten integers in a constant memory area, there may be a block, which is a total length of twenty integers long. After adding the boundary markers, one at the beginning of the first table and one to the beginning of the second table, then it can be determined that the size of the first table is ten integers.

Once the fix-ups for the cantles are examined, step 208 determines whether each cantle's dependencies have been checked. If each cantle's dependencies have not been checked, or if there are more cantles to be checked, the process returns back to step 206 to examine the fix-ups for the remaining cantles. However, if each cantle's dependencies have been checked and there are no more cantles to be checked, proceeding to step 210, a reduced dependency program graph (RDPG) for the old code is created. Creating a RPDG, in the manner illustrated in FIG. 2, is relatively easy once the cantles are identified and the interdependencies have been extracted. The RPDG created from the old code exits step 210. A RPDG is merely a graphical depiction of cantles (nodes) and their relationship to one another (edges) based on information contained in the object file.

Referring specifically to FIG. 3B, in step 212, the new software code is compiled into object files, wherein at step 214 the object files for the new software code are decomposed into constituent cantles as previously described for the old software code in step 204. The fix-ups for these new software cantles are examined in step 216. Step 218 determines whether each of the cantle's dependencies have been checked. If each cantle's dependencies have not been checked, the process returns back to step 216 to examine the fix-ups for the remaining cantles. Once all the cantle's dependencies have been checked, the process continues to step 220 wherein the RPDG for the new code is created.

Referring specifically now to FIG. 3C, at step 222, the RPDG's for the new code and old code are compared. The RPDG from the old code is routed there from entry point Q. (See FIG. 3A). The RPDG from the new code is routed there from entry point R. (See FIG. 3B). After RPDG's from the old code and the new code have been compared, a list of changes between the old and new software code is stored in X, as shown in step 224. X represents a collection of the changes or deltas noted in the new software code. Once these changes or deltas are collected, a patch file composed of the change functions is generated as shown in step 226.

Figure 4A:
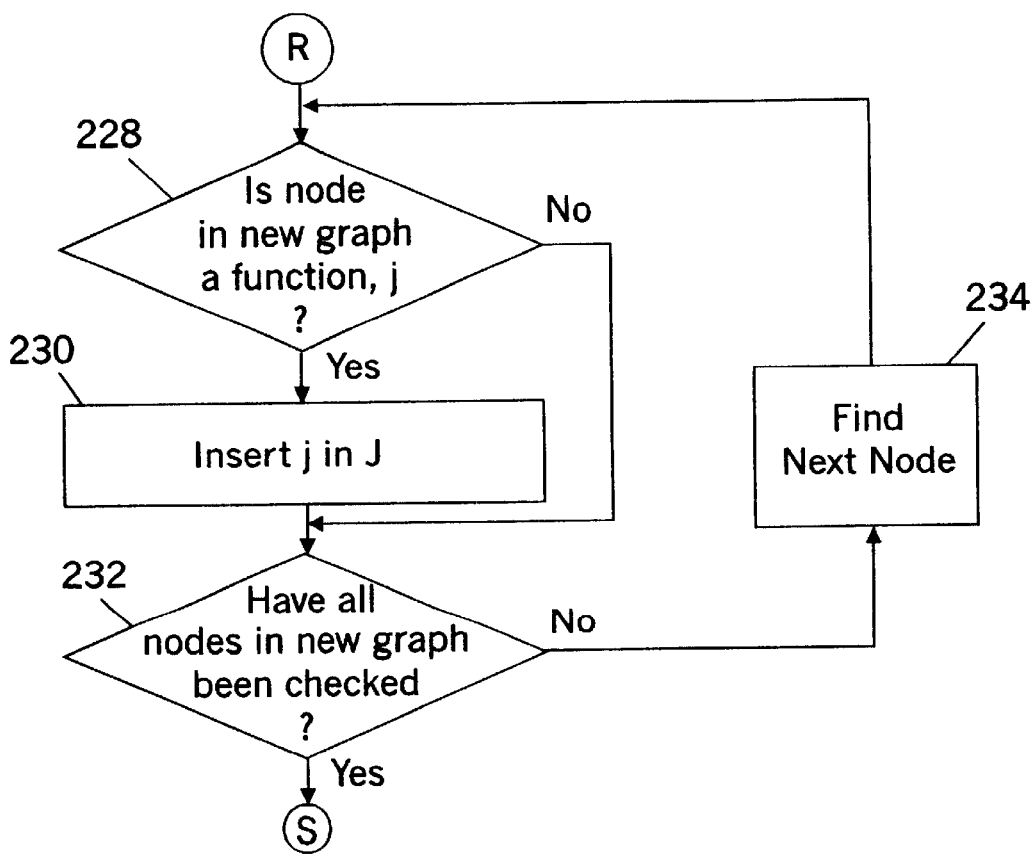
FIGS. 4A–4D are sub-flow charts illustrating the specific steps of comparing the RPDG's for the old software code and new software code as described in FIG. 3A.

FIGS. 4A–4D are a sub-flow chart to illustrate a detail of step 222 in FIG. 3C. FIGS. 4A–4D show process steps whereby the RPDG's for the new software code and the old software code are compared to determine the changes between the new and old software codes. Referring specifically to FIG. 4A, the new code RPDG is routed to step 228 via entry point R. Step 228 determines whether each node in the RPDG for new software code is a function. Each node is checked individually in step 228. If the checked node is a function j, it is inserted in J at step 230. J is a list of functions located in the RPDG for the new software code. Regardless of whether the checked node is a function, the invention proceeds to step 232 to determine whether the other nodes in the RPDG have been checked. If all of the nodes in the RPDG have not been checked, the process proceeds to step 234 where the next unchecked node in the RPDG is located, then, returns to step 228 and repeats this sequence until all nodes in the RPDG have been checked. Once all the nodes in the new RPDG have been checked, the process continues at step 244 in FIG. 4C from step 232 to an entry point S.

Figure 4B:
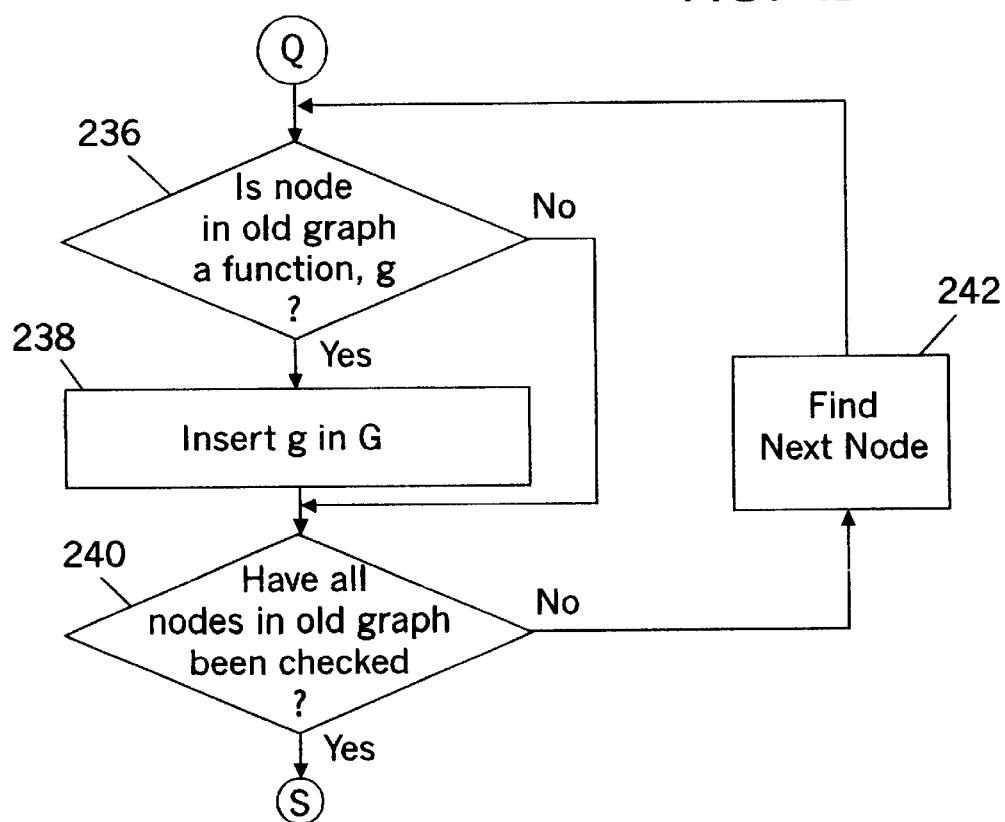

Referring now to FIG. 4B, step 236 determines whether each node in the old RPDG is a function. The old code RPDG is routed to step 236 via entry point Q. Each node is checked individually in step 236. If the checked node in the old RPDG is a function, then that function, g, is inserted in G in step 238. G is a list of functions found in the RPDG for the old code. If the checked node is not a function, the process proceeds to step 240 to determine whether the remaining nodes in the RPDG for the old software code have been checked. If all the nodes in the RPDG have not been checked, the process proceeds to step 242 wherein the next unchecked node in the RPDG is located and proceeds back to step 236. Similarly as for the new software code, this sequence of steps is repeated until all of the nodes in the RPDG have been checked. Once all the nodes in the RPDG have been checked, the process continues at step 244 in FIG. 4C via entry point S.

Figure 4C:
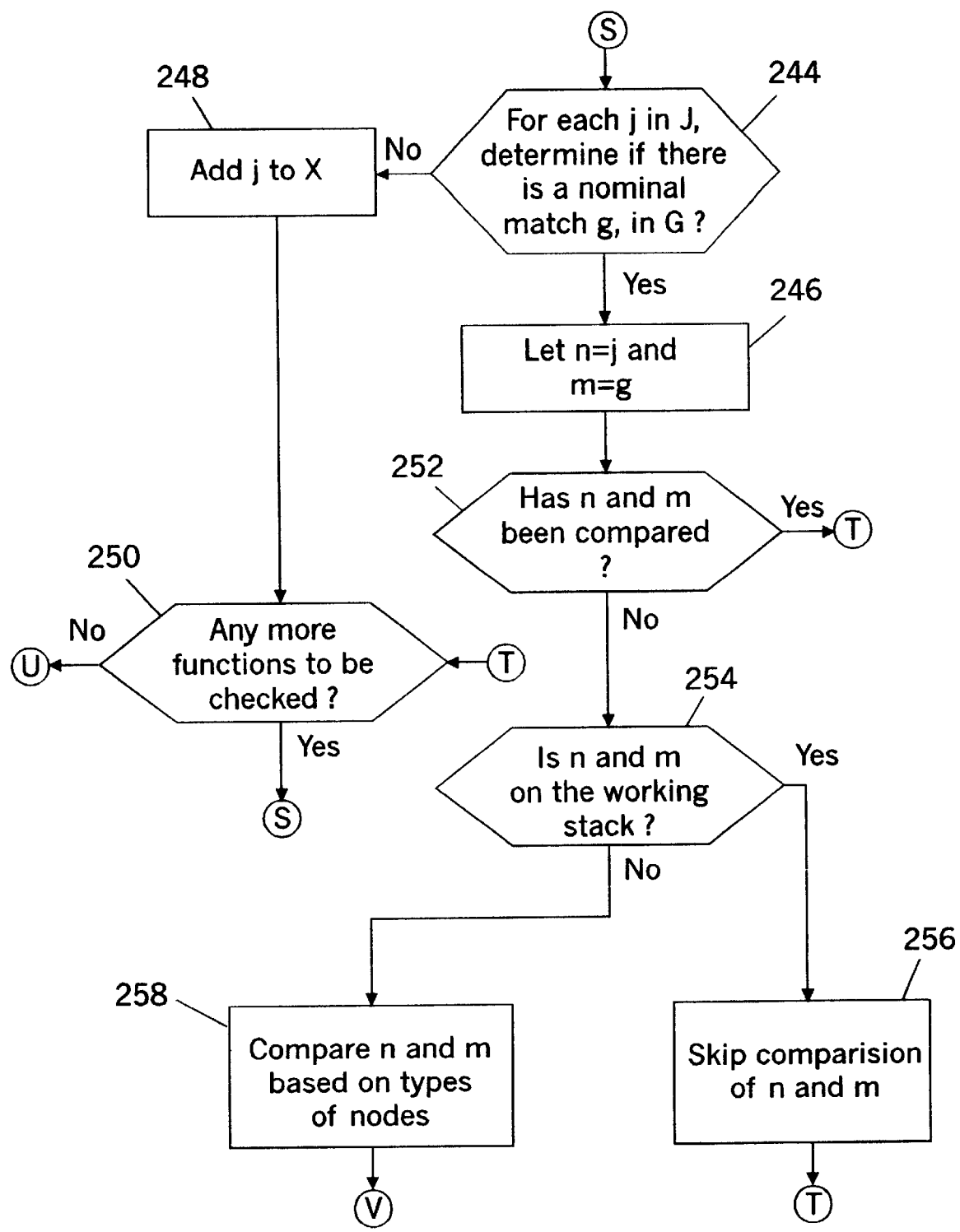

Referring now to FIG. 4C, at step 244, for each function, j in J, step 244 determines if there is a nominal matching function, g in G. If there is a nominal matching function, the assignments of n=j and m=g are made, as shown in step 246. If there is no nominal match, then step 248 adds function j to X. In Step 250 the process determines whether there are any more functions to be checked. If there are still functions to be checked the process returns to step 244 via entry point S. If there are no additional functions to be checked, then the process proceeds to step 224, as shown in FIG. 3C. At step 252 the process determines whether n and m have been compared, and if so, the process proceeds to step 250 via entry point T. If m and n have not been compared, then step 254 determines whether n and m are on the working stack, as commonly known in computer science technology. If n and m are on the working stack, the comparison of m and n is skipped in step 256 and returns to step 250 via entry point T. If m and n are not on the working stack, step 258 compares n and m based on types of nodes culminating at point V.

Figure 4D:
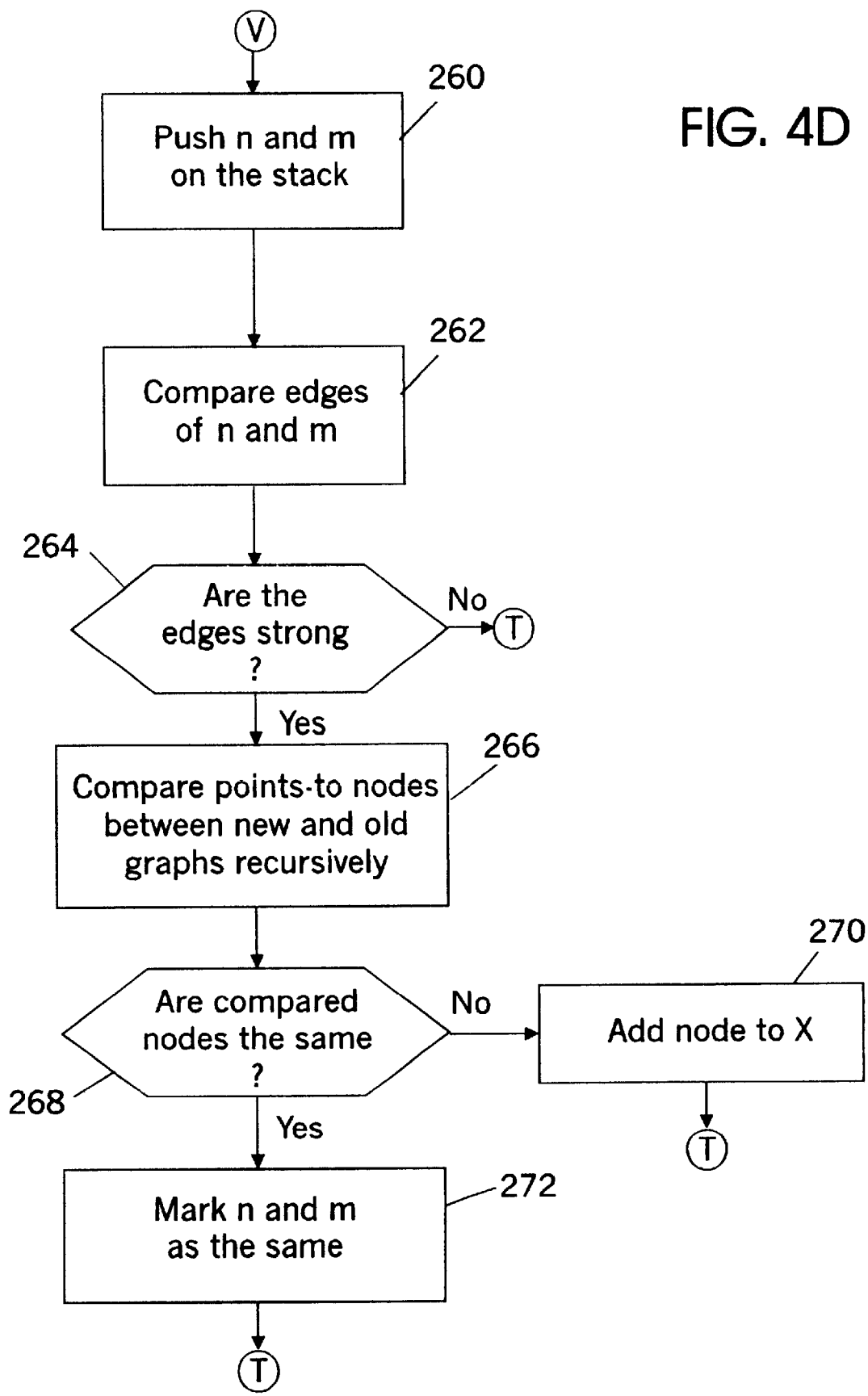

Referring specifically to FIG. 4D, from step 258 of FIG. 4C, n and m are pushed onto the working stack at step 258 via entry point V. Step 262 compares the edges of n and m. In Step 264 the process determines whether the edges of n and m are strong. If the edges of n and m are not strong, the process proceeds to step 250 as shown in FIG. 4C via entry point T. If the edges are strong, the process compares the nodes between the old and new graphs recursively in step 266. The term "weak edge" as used in this invention means any edge linked between two nodes of a function type. All other edges are considered to be strong. Continuing to step 268, the process determines whether the compared nodes are the same. In order to determine whether the compared nodes are the same, this invention checks to see if each node has the same number of edges. If the number of edges are different, the nodes are different.

This invention also determines whether each edge has the same fix-up type, same offset, same to-cantle, same to-offset. If the edge is strong, the nodes are compared recursively. If the nodes are the same, they are checked until all edges are found. If the to-nodes differ, they are marked as being different. If the edge is weak, the to-nodes are tested to determine if they have the same name. If they have different names, they are marked as being different. If the nodes are the same, and the edges are the same, then the nodes are marked as being "the same." If the nodes that are to be compared are functions, they are compared by their lengths, hash values and the content of the functions to determine if they are the same. Symbols are compared by their names. Variables are compared by name, size and, if known, content. Types are compared by size, layout, and by sub-types, if the variable has any. If the nodes are not the same, step 270 adds the node to the list of changes in X. Once again return to step 250 as shown in FIG. 4C via entry point T. If the compared nodes are the same, at step 272, n and m are marked as being the same. Return to step 250 via entry point T. At step 250, if there are no more functions to be checked, proceed to step 224 of FIG. 3C via entry point U. The list of changes in X at step 224 are listed. Step 226 generates a patch file composed of only these changed functions and their interdependencies.

Figure 5:
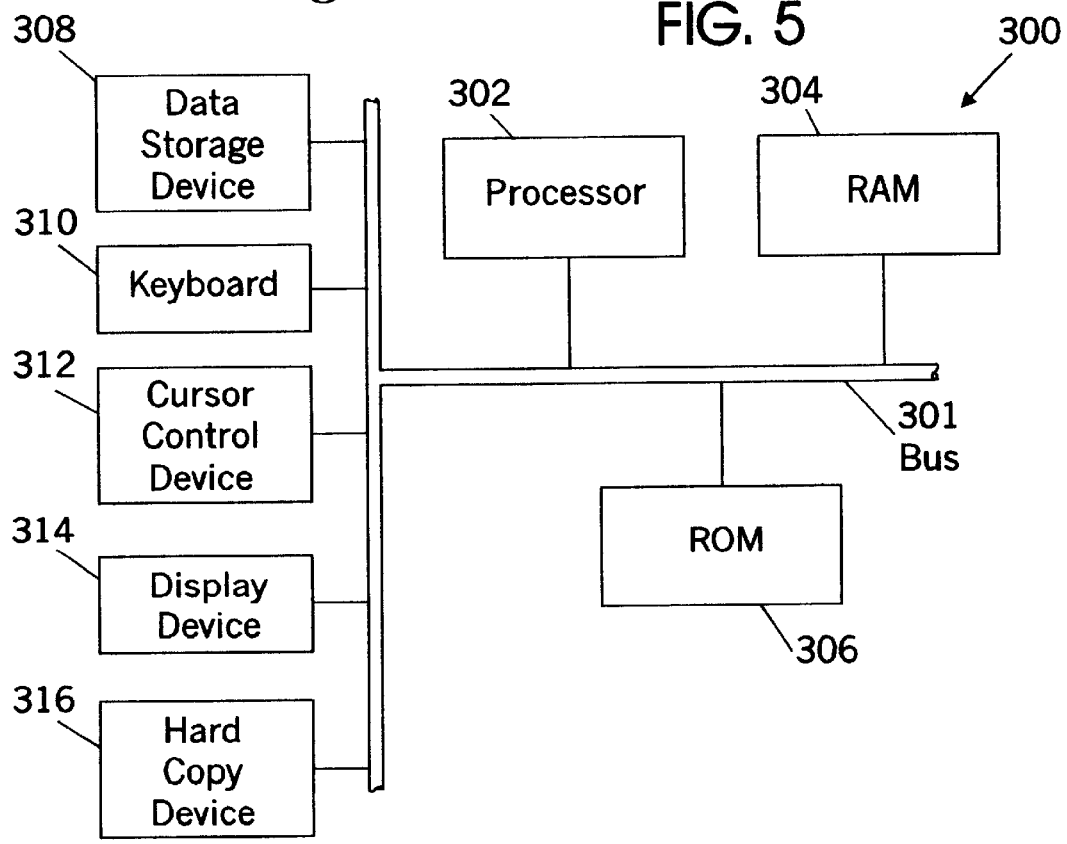
FIG. 5 is a block diagram illustrating the basic components of a computer system that is utilized by the preferred embodiment to create a patch in accordance with the invention.

In the preferred embodiment described herein, the computer system that is used to develop a patch in accordance with the invention is a HEWLETT PACKARD workstation, model B-180. The HP B-180 computer system of the preferred embodiment is described with reference to FIG. 5. The HP B-180 generally comprises a bus or other communication means 301 for communicating information and a processor 302 coupled with bus 301 for processing information. The HP B-180 workstation uses a HP/PARisc microprocessor, which is a commonly used HEWLETT PACKARD microprocessor. A random access memory (RAM) or other storage device 304 (commonly referred to as a main memory) is coded with bus 301 for storing information and instructions for processor 302, a read only memory (ROM) 306 coupled with bus 301 for storing information and instructions for processor 302. The HP B-180 also includes a data storage device 308, such as a magnetic disk or hard drive coupled with bus 301 for storing information and instructions. The HP B-180 also includes a disk drive (not shown) for receiving diskettes or CD-ROM's. An alpha numeric input device 310, including alpha numeric and other keys, is coupled with bus 301 for communicating information and command selections to processor 302. A cursor control device 312, such as a mouse, track ball, or cursor control keys, is coupled to bus 301 for communicating information and command selections to processor 302 and for controlling cursor movement and display device 314. Display device 314 is coupled to bus 301 and displays textual and graphical information. Additionally, it is useful if the system includes a hard copy device 316, such as a printer, for providing permanent copies of information. The hard copy device 316 is coupled with the processor 302 through bus 301. The HP B-180 may be connected to a network via an Ethernet connection.

The program of the invention is stored on the hard drive 308 in a file system, as commonly known. The old software program and the upgraded version of that software program are stored on a diskette (not shown). However, those programs could be stored on hard drive 308. The program of the present invention reads in the old and new software codes from the appropriate files of a diskette. These files are transferred via bus 301 to another program stored on data storage device 308, the compiler, for translation into separate object files. This translation reads the source files from the disk, processes them in core memory, and writes the result back to the disk.

The program reads in the object files from disk and cantlizes the information from those files in core memory. These cantles are then used to construct the RPDG in memory. The program compares the two RPDG's and marks the changes made by the patch writer. Using this list of information, knowledge of which functions changed, as well as other packaging information (provided by the patch writer), the patch file is constructed and written to disk. This file can then be downloaded to the target computing device (computer or switch) and used in the field to correct problems, revise or upgrade old software. I have described specific embodiments of my invention which provides a way in which patches can be developed by comparing object files of two software programs. One of ordinary skill in the art will quickly recognize that the invention has other applications in other environments. In fact, many embodiments and implementations are possible. The following claims are in no way intended to limit the scope of the invention to the specific embodiments described.

We claim:

1. A method of creating a software patch by comparing a first object file of a first software program to a second object file of a second software program, the method comprising the steps of:

decomposing said first object file and said second object file into respective constituent cantles;

developing a first reduced program dependency graph for said first object file;

developing a second reduced program dependency graph for said second object file;

comparing said first reduced program dependency graph to said second reduced program dependency graph, wherein said comparing comprises:

locating functions of said first reduced program dependency graph;

locating functions of said second reduced program dependency graph;

determining if functions of said first reduced program dependency graph are on a working stack; and comparing said functions of said second reduced program dependency graph to said functions of said first reduced program dependency graph if said functions of said first reduced program dependency graph are not on the working stack;

determining the changes between said first reduced program dependency graph and said second reduced program dependency graph; and creating a patch comprised of said changes.

2. The method of claim 1 further comprising the step of examining fix-up information for each of said respective cantles.

3. The method of claim 1 wherein decomposing said first object file comprises grouping information into sections.

4. The method of claim 1 wherein decomposing said second object file comprises grouping information into sections; and further comprising determining if functions of said second reduced program dependency graph are on a working stack.

5. A method of creating a software patch by comparing code of a first software program to code of a second software program, the method comprising the steps of:

compiling said code of said first software program and said code of said second software program to form a first object file and a second object file, respectively;

decomposing said first object file and said second object file into respective constituent cantles;

examining fix-up information for each of said respective cantles;

developing a first reduced program dependency graph for said first object file;

developing a second reduced program dependency graph for said second object file;

comparing said first reduced program dependency graph and said second reduced program dependency graph to determine changes between said first reduced program dependency graph and said second reduced program dependency graph, wherein said comparing comprises:

locating functions of said first reduced program dependency graph;

locating functions of said second reduced program dependency graph;

determining if functions of said first reduced program dependency graph are on a working stack; and comparing said functions of said second reduced program dependency graph to said functions of said first reduced program dependency graph if said functions of said first reduced program dependency graph are not on the working stack; and creating a patch comprised of said changes.

6. Apparatus for creating a software patch by comparing code of a first software program to code of a second software program, the apparatus comprising:

means for compiling said code of said first software program and said code of said second software program to form a first object file and a second object file, respectively;

means for decomposing said first object file and said second object file into respective constituent cantles;

means for examining fix-up information for each of said respective cantles;

means for developing a first reduced program dependency graph for said first object file;

means for developing a second reduced program dependency graph for said second object file;

means for comparing said first reduced program dependency graph and said second reduced program dependency graph to determine change between said first reduced program dependency graph and said second reduced program dependency graph, wherein said means for comparing comprises:

means for locating functions of said first reduced program dependency graph;

means for locating functions of said second reduced program dependency graph;

means for determining if functions of said first reduced program dependency graph are on a working stack; and means for comparing said functions of said second reduced program dependency graph to said functions of said first reduced program dependency graph if said functions of said first reduced program dependency graph are not on the working stack; and means for creating a patch comprised of said changes.

7. A computer program produce for creating a software patch by comparing code of a first software program to code of a second software program, the computer program product having a medium with the computer program embodied thereon, the computer program comprising:

computer program code for compiling said code of said first software program and said code of said second software program to form a first object file and a second object file, respectively;

computer program code for decomposing said first object file and said second object file into respective constituent cantles;

computer program code for examining fix-up information for each of said respective cantles;

computer program code for developing a first reduced program dependency graph for said first object file;

computer program code for developing a second reduced program dependency graph for said second object file;

computer program code for comparing said first reduced program dependency graph and said second reduced program dependency graph to determine changes between said first reduced program dependency graph and said second reduced program dependency graph, wherein said computer program code for comparing comprises:

computer program code for locating functions of said first reduced program dependency graph;

computer program code for locating functions of said second reduced program dependency graph;

computer program code for determining if functions of said first reduced program dependency graph are on a working stack; and computer program code for comparing said functions of said second reduced program dependency graph to said functions of said first reduced program dependency graph if said functions of said first reduced program dependency graph are not on the working stack; and computer program code for creating a patch comprised of said changes.

8. A computer system for creating a software patch by comparing code of a first software program to code of a second software program comprising:

a processor for processing information;

a RAM device for storing information and instructions for said processor;

a ROM device for storing information and instructions for said processor;

a bus connected to said processor, RAM and ROM devices for communicating with said processor, RAM and ROM devices; and computer program code for compiling said code of said first software program and said code of said second software program to form first and second object files;

computer program code for decomposing said first and second object files into respective constituent cantles;

computer program code for examining fix-up information for each of said respective cantles;

computer program code for developing a first reduced program dependency graph for said first object file and a second reduced program dependency graph for said second object file;

computer program code for comparing said first reduced program dependency graph and said second reduced program dependency graph and determining changes between said first reduced program dependency graph and said second reduced program dependency graph, wherein said computer program code for comparing comprises:

computer program code for locating functions of said first reduced program dependency graph;

computer program code for locating functions of said second reduced program dependency graph;

computer program code for determining if functions of said first reduced program dependency graph are on a working stack; and computer program code for comparing said functions of said second reduced program dependency graph to said functions of said first reduced program dependency graph if said functions of said first reduced program dependency graph are not on the working stack; and computer program code for creating a patch comprised of said changes.

9. A method of creating a software patch by comparing a first software program to a second software program, comprising the steps of:
- compiling said first software program and said second software program to form respectively a first object file and a second object file;
- determining changes between said first object file and said second object file, wherein determining comprises:
  - locating functions of said first software program;
  - locating functions of said second software program;
  - determining if said functions of are on a working stack; and
  - comparing said functions of said second software program to said functions of said first software programs if said functions are not on the working stack; and
- creating a patch comprised of said changes.

10. Apparatus for creating a software patch by comparing a first software program to a second software program, the apparatus comprising:
- means for compiling said first software program and said second software program to form respectively a first object file and a second object file;
- means for determining changes between said first object file and said second object file, wherein said means for determining comprises:
  - means for locating functions of said first software program;
  - means for locating functions of said second software program;
  - means for determining if said functions of are on a working stack; and
  - means for comparing said functions of said second software program to said functions of said first software programs if said functions are not on the working stack; and
- means for creating a patch comprised of said changes.

11. A computer program product for creating a software patch by comparing a first software program to a second software program, the computer program product having a medium with the computer program embodied thereon, the computer program comprising:
- computer program code for compiling said first software program and said second software program to form respectively a first object file and a second object file;
- computer program code for determining changes between said first object file and said second object file, wherein said computer program code for determining changes comprises:
  - computer program code for locating functions of said first software program;
  - computer program code for locating functions of said second software program;
  - computer program code for determining if said functions of are on a working stack; and
  - computer program code for comparing said functions of said second software program to said functions of said first software programs if said functions are not on the working stack; and
- computer program code for creating a patch comprised of said changes.

12. A computer system operable to create a software patch by comparing a first software program to a second software program by performing the steps of:
- compiling said first software program and said second software program to form respectively a first object file and a second object file;
- determining changes between said first object file and said second object file, wherein said determining comprises:
  - locating functions of said first software program;
  - locating functions of said second software program;
  - determining if said functions of are on a working stack; and
  - comparing said functions of said second software program to said functions of said first software programs if said functions are not on the working stack; and
- creating a patch comprised of said changes.

* * * * *